United States Patent [19]

Nett

[11] Patent Number: 4,721,094
[45] Date of Patent: Jan. 26, 1988

[54] DEEP OIL COOKER COVER APPARATUS
[75] Inventor: Louis Nett, Cambridge, Wis.
[73] Assignee: Gallina Corporation, Waukesha, Wis.
[21] Appl. No.: 847,326
[22] Filed: Apr. 2, 1986
[51] Int. Cl.[4] .................................................. F24D 1/00
[52] U.S. Cl. ......................................... 126/369; 99/403; 126/377; 219/440; 220/314; 220/316; 220/347
[58] Field of Search ............... 126/20, 369, 377, 378, 126/389; 219/431, 440; 292/260, 115, 106; 220/316, 314, 243, 247, 329, 347; 99/444, 408, 403, 330

[56] References Cited

U.S. PATENT DOCUMENTS

| | | | |
|---|---|---|---|
| 1,208,041 | 12/1916 | Steere | 220/316 |
| 1,361,946 | 12/1920 | Whitaker | 126/20 |
| 1,821,726 | 11/1929 | Saporta | 220/314 |
| 2,622,591 | 12/1952 | Bramberry | 126/369 |
| 2,778,736 | 1/1957 | Wagner | 126/369 |
| 2,917,200 | 12/1959 | Phelan et al. | 220/316 |
| 3,314,416 | 4/1967 | Wagner | 126/369 |
| 3,463,077 | 8/1969 | Lescure | 99/410 |
| 3,610,133 | 10/1971 | Mies, Jr. et al. | 99/410 |
| 3,776,125 | 12/1973 | Yoshioka | 126/385 |
| 3,964,637 | 6/1976 | Luebke et al. | 220/314 |
| 3,976,218 | 8/1976 | Stoermer | 220/316 |
| 4,103,801 | 8/1978 | Walker | 220/203 |
| 4,273,991 | 6/1981 | Barnhill | 126/369 |
| 4,299,331 | 11/1981 | Bertola | 220/316 |
| 4,307,818 | 12/1981 | Singh et al. | 220/316 |
| 4,325,491 | 4/1982 | Barnhill | 220/316 |
| 4,347,833 | 9/1982 | Luebke et al. | 126/369 |
| 4,362,148 | 12/1982 | Luebke et al. | 126/377 |
| 4,485,936 | 12/1984 | Pardo et al. | 220/316 |
| 4,498,695 | 2/1985 | Pardo | 292/260 |
| 4,541,543 | 9/1985 | Elexpuru | 220/316 |

Primary Examiner—James C. Yeung
Attorney, Agent, or Firm—Andrus, Sceales, Starke & Sawall

[57] ABSTRACT

A pressure interlock means to prevent release and opening of the cover under a potentially dangerous condition. The cooking apparatus is formed including a suitable open-top pot having a top cover unit secured to open and close the pot. Cooking oil is contained within the pot to a suitable depth or level spaced from the pressure cover unit. A pressurized deep oil cooker has a cover unit and includes a clamp bar pivotally connected to one side of a cooking pot. A mechanical hook unit couples a hook member on the free end of the bar to a pin. A plate cover has a D-shaped seal in a dovetail groove and abutts the upper edge of the pot. The cover is secured to the cam by a slotted connection permitting limited movement of the cover relative to the bar. A cam unit is coupled to the bar and has a rotating cam having a release position in which limited movement of the cover is permitted and a locking position which spreads the clamp bar relative to said cover to seal the cover and set the latch. A pressure sensitive piston in the cover moves into the path of a pin on cam operating handle to prevent to release with a pressure in the pot. An electrically operated pressure relief releases the pressure at the end of a cooking cycle.

12 Claims, 9 Drawing Figures

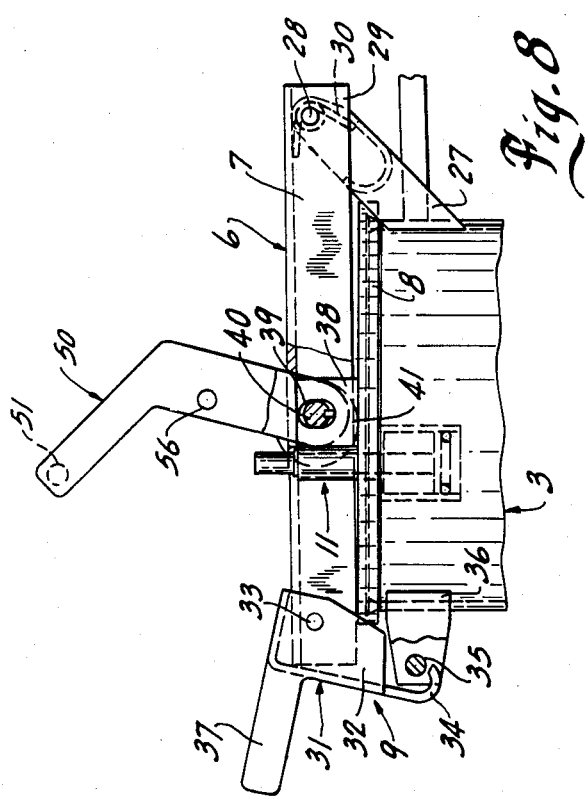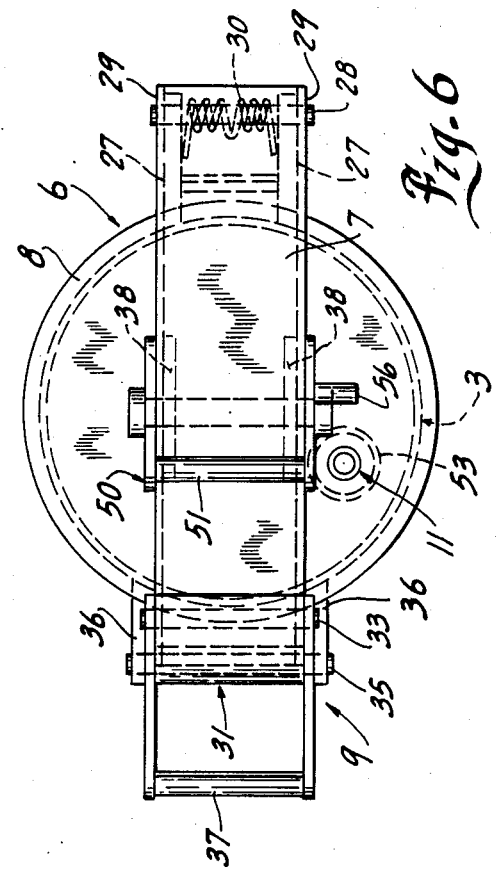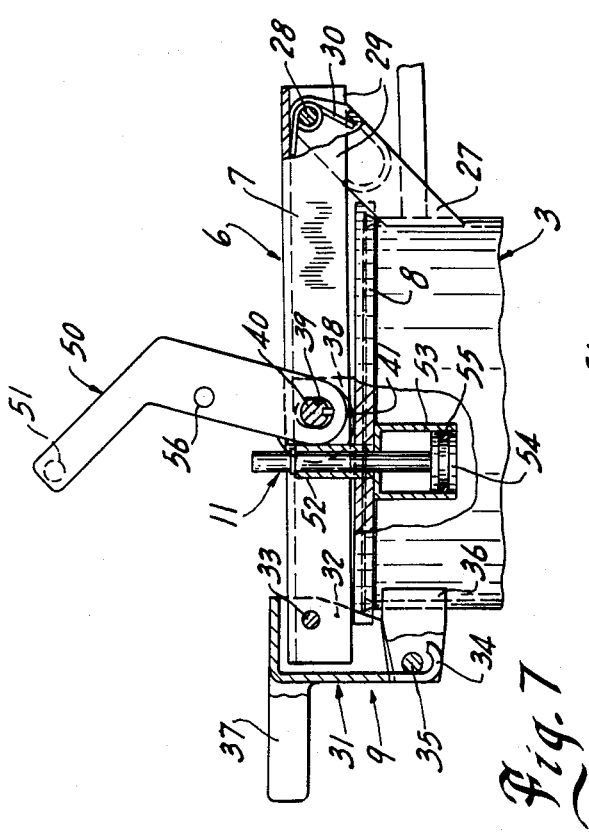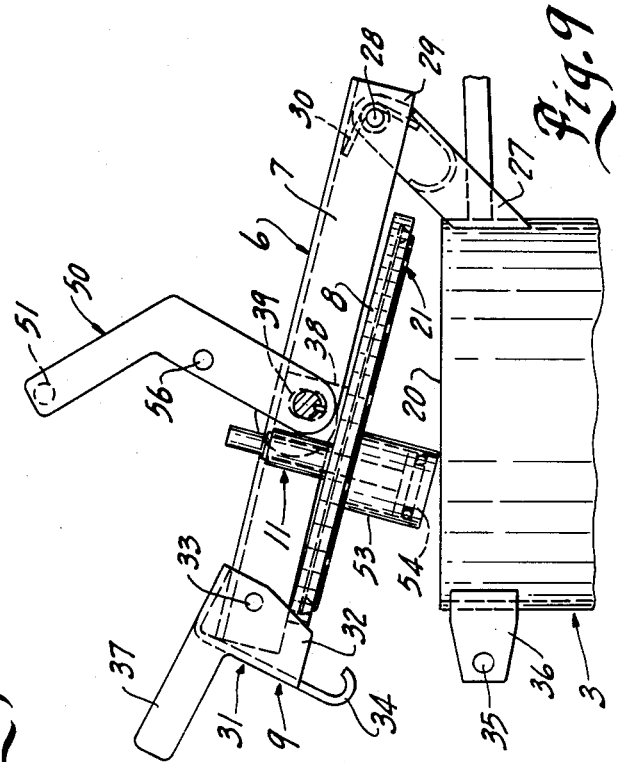

DEEP OIL COOKER COVER APPARATUS

BACKGROUND OF THE PRESENT INVENTION

This invention relates to a cover apparatus for a deep oil cooker having a sealed cover for high pressure operation and particularly to such a cover for rapid and safe closure and opening of the cooker.

Deep oil cookers are widely used by restaurants for cooking chicken, fish and other foods by immersion in hot cooking oil. Certain restaurants specialize in such foods, particularly deep cooked chicken. In addition to the conventional restaurant where the food is consumed on the presmies, various restaurants and other food retail outlets have a substantial food carry-out business including chicken. In those restaurants and other outlets having large sales volume of cooked foods, a rapid and efficient cooker is essential in order to produce quality products at a reasonable and profitable cost.

The pressure cooking apparatus includes a large kettle or pot having a releasably attached high pressure cover. The pot is filled with cooked oil to a level in spaced relation to the cover. A heating unit is immersed in the oil or an encircling coil unit is coupled to the pot to increase the temperature of the oil to the desired cooking level. The chicken parts are held in a suitable basket and immersed in the oil with the cover closed for deep cooking for a selected period.

The copending application of the inventor filed herewith and entitled "Deep Oil Cooking Apparatus", discloses a particularly satisfactory pressure cooker particularly for cooking food such as chicken.

The cover structure is releasably latched to the pot to seal the pot and create a pressure cooker for the rapid and thorough cooking of the product, and is manually opened and the product removed. The hot oil and vapors created during the cooking cycle present a potentially dangerous condition of the end of the cooking cycle.

In use, the high pressure cooker requires release of the pressure within the cooker prior to removal of the cover. The system should therefore be constructed with some means to release the pressure and establish a safe condition at the end of the cycle, and thereby permit safe cover removal for removable of the cooked chicken. Generally, a manual or automatic pressure release means is provided to release the pressure.

The prior art has further suggested various covers having a mechanical interlock mechanism which incorporates a pressure release unit to prevent opening of the cover with cooking pressure in place. Care is still required by the operator in the event a residual pressure condition exists in the pot notwithstanding operation of the pressure relief means and the interlock mechanism. The efficiency of the cycling is also directly related to the ease of removing the cover for access to the cooker pot.

A releasable cover having a safety interlock is shown in U.S. Pat. No. 3,976,218 which issued Aug. 24, 1976. A cover member rests on the top of a cooking pot. A pivoted arm is secured to one side of the square pot and extends over through a channel formed in the cover. A releasable latch on the opposite side secures the bar to the opposite side of the pot. A threaded shaft is threaded through the bar and is rotated into bearing engagement with the cover to establish a fluid type seal. A diaphram is secured overlying the inner face of the cover. A spring loaded pin is possitively moved by the diaphram above the exterior of the cover in response to pressures within the pot. The rotating shaft is provided with a rotating radially notched plate. When the cover is tightened to the closed position, a notch is aligned with the pin opening. Thus with pressure in the pot, the pin moves outwardly into a locking location. A similar combined pressure interlock is shown in U.S. Pat. No. 4,299,331 which issued Nov. 10, 1981. In the latter patent, the cover has a sealing edge located inside a specially formed rim on the pot. A clamping bar spans the pot with the opposite ends coupled to the outer rim portion. A pivoting cam on the bar to expand the cover into the interior sealing engagement. The cam has a lug aligned with a vertical pin member slidably mounted in the cover. The pressure in the cooking kettle forces the pin outwardly into an aperature in the lug to produce an interlock.

U.S. Pat. No. 2,917,200 which issued Dec. 15, 1959 discloses the cooking kettle having a heavy cover structure mounted in a hydraulically actuated vertical positioning yoke assembly. A positioning cam unit is mounted between the yoke and the cover for positively lowering and lifting of the cover. The cover has a pressure responsive pin in the central portion thereof. The cam is provided with a slot in the cam surface. In the closed cover position, the slot is aligned with the pin. The pressure in the pot again moves the pin outwardly into the cam slot to possitively lock the unit into a locked position Other pot closures systems are shown in various other U.S. patents including the following which have been particularly considered in preparation of this disclosure.

| PATENT NO. | INVENTOR | ISSUED DATE |
|---|---|---|
| 1,208,041 | Steere | 12/12/16 |
| 1,821,726 | Saporta | 11/22/29 |
| 2,778,736 | Wagner | 01/22/57 |
| 3,964,637 | Luebke | 06/22/76 |
| 4,103,801 | Walker | 08/01/78 |
| 4,307,818 | Singh | 12/29/81 |
| 4,325,491 | Barnhill | 04/20/82 |
| 4,347,833 | Luebke | 07/07/82 |
| 4,362,148 | Luebke | 12/07/82 |
| 4,485,936 | Pardo | 12/04/84 |
| 4,498,695 | Pardo | 02/12/85 |
| 4,541,543 | Elexpuru | 09/17/85 |

The prior art cover structures generally involve relatively complicated structures or other structures which are difficult to apply and use in a commercial restaurant and institutions, and the like where relatively high volume production is required. Further, the units do not generally anticipate protection against any residule relatively low pressures which may exist within the pot even after operation of the normal release pressure systems.

There is therefore a continuing demand for an improved cover structure which can operate under the high pressures required for deep cooking and which of course has the necessary long life required by commercial application. The cover unit of course must provide maximum safety and anticipate the less than perfect operation of the normal pressure release systems.

Although various deep cooking pot units are used in the industry, there is a continuing need for a more efficient and effective batch cooking pot-type apparatus and particularly a cover apparatus which is simple in structure and includes means permitting safe and reliable opening of the cooker.

SUMMARY OF THE PRESENT INVENTION

The present invention is particularly directed to an improved deep cooker cover apparatus for a pressurized batch cooking pot and particularly having pressure interlock means to prevent release and opening of the cover under a potentially dangerous condition. The cooking apparatus is formed including a suitable open-top pot having a top cover unit secured to open and close the pot. Cooking oil is contained within the pot to a suitable depth or level spaced from the pressure cover unit. Generally in accordance with the teaching of the present invention the cover unit includes a clamp unit including a clamp bar member which is connected by a pivotal connection to one side of the cooking pot. The bar member projects over the top of the pot to an outer free end. A mechanical releasable latch unit interconnects the outer free end of the clamp bar member to the pot, and is constructed such that the latch is set by upward pivoting of the bar. A plate-like cover has an annular o-ring seal adapted to rest in abutting sealing engagement with the upper edge of the cooking pot. A cam unit is interconnected between the clamp bar and the cover and includes a movable cam element having a release position wherein the cover member abuts the cooking pot and the latch unit is released for manual opening of the cover unit. In this position, limited movement of the cover is permitted and will permit safe release of any residual pressure in the pot. The cam element has a second locking position which spreads the clamp bar relative to said cover to force the cover into engagement with the cooking pot, simultaneously with the setting of the latch unit. In opening the pressure cooker, the operator must first activate the release clamp unit and then simultaneously move the latch unit from its released position to raise the cover unit to the vertical open position permitting complete access to the cooking pot. A pressure sensitive mechanical safety mechanism is coupled to the cooking pot and moves into engagement with the release handle unit to positively prevent movement to the release position with a predetermined pressure in said cooking pot. In addition, an electrically operated pressure relief is coupled to the pot and operated by a cooker controller to release the pressure at the end of a cooking cycle to establish a normal operational cycle.

In a preferred construction the clamp bar member is an inverted channel member with an elongated cam element having a spiral cam surface rotatably mounted between the sidewalls by a cam shaft. The cover has a pair of coupling arms or brackets which project upwardly and are coupled to the cam shaft by coupling slots to pivotal mount the cover to the bar and premit relative movement therebetween. A U-shaped release handle has side arms coupled to the cam shaft and is operable to pivot the cam between the two positions. The cam has a pair of adjacent flat surfaces opposite the spiral cam face or surface. The flat surfaces move into engagement with the inner wall of the bar to hold the cam and handle in the alternate locations. The latch unit includes a hook plate pivotally secured to the outer end of the bar. A hook rod is secured to the pot. The hook plate in the release position has the hook on the lower end spaced below the rod and is pulled upwardly into a set position and latching engagement with the rod by the movement of the cam and the clamp bar member to the cover close position.

The cover is a solid flat plate having a flat inner face. An annular dovetail groove is provided on the inner face and the o-ring seal element has a generally D-shaped cross-section. The seal element is inserted with the base in the groove and is held in the groove by the edges of the groove with the seal projecting outwardly thereof. The gasket is held properly against rotating and possible loss of seal. Upon sealing, the seal element is deformed against the edge and within the groove to produce a firm, reliable pressure seal of the cover unit.

The pivot unit in a preferred construction includes a pair of pivot plates fixed to the side wall of the pot. The plates project upwardly and outwardly above the pot. A cup-shaped collector pan is secured between the pivot plates and located to capture moisture and/or oil draining from the cover in the raised vertical position of the cover. A drain line connected to the collector drains the oil to a discharge unit such as a collecting container.

The present invention has been found to significantly contribute to the effective and efficient sealing of the cooking pot with a cover unit which safely operate a batch cooker.

DESCRIPTION OF THE DRAWING FIGURES

The drawings furnished herewith generally illustrate the best mode presently contemplated for the invention and are described herewith.

In the drawings:

FIG. 1 is a side elevational view of a portable chicken cooker with parts broken away and sectioned;

FIG. 2 is a fragmentary front view of the cooker shown in FIG. 1;

FIG. 3 is a fragmentary enlarged vertical section taken generally on line 3—3 of FIG. 1 and illustrating a safety cover interlock for the cover unit;

FIG. 4 is a vertical section taken generally on line 4—4 of FIG. 3;

FIG. 5 is an enlarged fragmental view of the cover shown in FIGS. 1-4;

FIG. 6 is a top plan view of the cover unit; and

FIG. 7-9 are similar side views showing the opening cover sequence of the cooker shown in FIGS. 1-6.

DESCRIPTION OF THE ILLUSTRATED EMBODIMENT

Referring to the drawings and particularly to FIGS. 1-5, a portable deep cooker 1 is illustrated for sequential or successive deep cooking of chicken parts 2 or other similar means or fish product. The deep cooker includes an inner open-top cooking pot 3 mounted within a portable decorative and protective support structure. A cooking oil 4 fills the pot 3 to a selected level in downwardly spaced relation to the upper end. A cover unit 6 is releasably, pressure sealed to the upper end of the cooker. The cover unit includes a clamp bar 7 which carries a cover 8. The bar 7 is pivotally secured to the one side of the pot 3. A latch mechanism 9 connects the opposite end of the clamp bar to the opposite side of the pot. The cover 8 is connected to bar 7 by a cam unit 10 which is selectively operable to release the cover and tightly seal the cover to cooker pot 3 and define a high pressure, deep oil cooker. The cam unit 10 and cover 8 includes a pressure interlock member 11 which prevents opening of pot 3 with pressure in pot 3. In the illustrated embodiment, a radiant heating unit 12 encircles the pot 3 for rapid and effective heating of oil 4. The radiant heating unit 12 is specially constructed with a heating coil 13 embedded within a high temperature insulation shell 14, in accordance with the inventor's copending application previously identified. The total assembly is housed within a decorative and protective enclosure or cabinet 15, with the integrated pot 3 and heating unit 12 supported on a suitable base superstructure. A front access door 16 is pivotally secured to the cabinet and provides access to the heating unit 12 and other components. An oil reservoir drawer 17 is provided in the front, bottom of the cabinet 15 and the lower end of the pot 3 is provided with an outlet connected in a flow circuit with a filtration and recycling system 18 for circulating of the oil 4 from and back to the pot 3 to remove foreign matter created during the cooking cycle.

A food basket 19 is adapted to be placed within the pot 3 and supports the chicken parts 2 immersed within the oil 4 for cooking. The basket 19 is removed and replaced with another for replacement of the cooked chicken with uncooked chicken.

In the operation, the basket 19 of uncooked chicken 2 is placed in the cooker pot 3 and the cover unit 6 is closed and sealed. The heating unit 12 is energized to rapidly bring and hold the temperature of oil 4 to a desired operating temperature such as within the range of 300° to 335° during the cooking cycle. The heating cycle creates pressure within the sealed cooking pot 3. At the end of the cooking cycle, the the pressure is automatically released and the cover unit 6 is raised and the basket of cooked chicken 2 is rapidly removed, allowed to drain and replaced with a basket of uncooked chicken. The cover unit 6 is replaced and the cycle repeated.

The present invention is particularly directed to the construction of the cover unit 6 and it coupling to the cooking pot 3. The various illustrated structures are shown in the preferred constructions as more fully described in the inventors previously identified application but may be of any desired construction within the teaching herein. The other structures are therefore described in such detail as to fully disclose the preferred construction of the present novel cover unit.

More particularly in the illustrated embodiment of the invention, the cooking pot 3 is shown formed as an integral tubular, round unit of a suitable metal such as stainless steel and is formed as relatively heavy wall element such as of a 10 guage metal. The upper end of the pot is a flat, smooth wall 20 defining a smooth sealing wall.

Generally, the cover 8 of unit 6 is a solid metal plate having a flat, planar inner face and which extends over the top wall of pot 3 and particularly the finished sealing wall. A sealing gasket 21 is located within an inner surface groove 22 in the cover and engages the upper flat edge 20 of the pot 3. As most clearly shown in FIG. 5, the groove 22 is a dovetail cross-section which widens inwardly of the groove entrance 23. The gasket 21 in an annular ring member having a generally pear shaped cross section, including a D-shaped base 23a of a diameter slightly greater than the groove opening and less than the internal width of the groove 22. An outer seal lip 23b is integrally formed with base 23a and protrudes from the entrance opening 23. The cover plate 8 is forced downwardly by the cam unit 10 and forces the gasket onto the top wall of pot 3. The gasket 21 and particularly base 23a is deformed within the groove 22, while the lip 23b engages the top wall of the pot 3, to establish a reliable and long life seal to tightly seal the pot, as presently described. The D-shaped base prevents rotation of the guard within the groove.

The cover unit 6 is pivotally mounted to the pot 3 by a pivoted hinge unit 24 which is pivotally affixed to clamping bar 7 which extends across the cover 8 and pot 3. The bar 7 is secured to the pivot hinge 24 at one end and the mechanical latch unit 9 is secured to the opposite outer free end and to the pot 3. The hinge 24 includes laterally spaced mounting arms 27, which are plate-like member. The one end of each arm member 27 is welded or otherwise secured in a vertical plane to the side of the pot 3 and extends upwardly and outwardly therefrom. A pivot pin 28 extends through the bar 7 and outer ends of the arms 27 to establish the pivot connection.

Bar 7 is movable between the horizontal cover closing position shown in full line and a raised vertical position shown in phantom FIG. 1. The illustrated clamp bar 7 is an inverted channel shaped member. The depending sidewalls 29 of the bar 7 telescope with the pivot arms 27 and the pivot pin 28 extends therethrough. A torsion spring 30 encircles pin 28 and acts between the bar 7 and pots to urge the cover unit to the fully open position. The cover and clamp bar unit is relatively heavy assembly. For example, in a commercial unit such as more fully disclosed in the copending application, the assembly weighted approximately 30 pounds. The torsion spring 30 holds the assembly in the raised position as well as makes positioning of the cover convenient and safe.

With the bar 7 in the cover close position, a lifting force is created by operation of the cam unit 10 on the clamp bar 7 which is transmitted to the latch unit 9 to set the latch unit and prevent the upward pivoting of the bar 7.

The latch unit 9 is secured to the outer free end of bar 7. The latch unit 9 includes a channel shaped hook member or plate 31 having sidewalls which telescope over the outer end of the bar 7 and with the plate extending across the end of the bar. The side walls 32 of hook plate 31 telescope over the opposite sides of bar 7 pivotally secured in place by a pivot pin 33. The plate 31 extends from the bar such that in the closed cover position the lower end of the plate is below the top edge of the pot 3 and terminates in an upwardly opening clamp hook 34. A latch pin or rod 35 is affixed to the front of the pot 3 between a pair of arm bracket 36 which are similarly welded or otherwise affixed to the pot. With the bar 7 pivoted downwardly, the hook 34 pivots outwardly and moves below the pin 35. The hook 34 then swings beneath and into the latch alignment with the pin 35, as shown in FIG. 7. The opposite end of the hook plate has a laterally outwardly projecting member or portion extending outwardly from the bar and defining a handle 37 for pivoting of the hook plate.

The cover 8 is secured to the center of the bar 7 by cam unit 10 to form an integrated assembly to move as a single assembly and which in a release position permits limited relative movement between the bar 7 and cover 8, as follows.

A pair of aperatured arms or brackets 38 are secured to the center of cover 8 and project outwardly therefrom at an angle of 90 degrees. The arms 38 are located to the opposite sides of the clamp bar 7. The arms 38 have similar coupling slots 39 aligned with the cam shaft openings in bar 7. A cam shaft 40 extends through the slots in arms 38 and the sidewalls of the bar 7. An elongated cam 41 is located within the arm on shaft 40 and keyed as by key 42 or otherwise secured to the shaft. The cam 41 is solid metal member and has a spiral cam surface 43 engaging the top surface of the cover and establishes an expanding force between the bar 7 and the cover 8. The circumferential length of spiral cam surface 43 has a span of approximately 180°. First and second flat locking surfaces 44 and 45 are formed on the opposite side of the cam 41 from surface 43. Locking surface 44 is substantially spaced at 180° from the maximum radius portion 46 of cam 41 while locking surface 45 extends at an appropriate angle from surface 43 and is similarly spaced 180° from the small radius portion 47 of cam 41. The locking surfaces 44 and 45 and the base engage the base wall 48 of the bar 7 in the perspective operative position of the cam 1.

An operating handle 50 also of a U-shaped configuration, had side walls which project over the bar and are secured as by a keyed connection on opposite ends of the pin 40 for pivoting of the cam pin and attached cam 41. The upper end of the handle walls are angled forwardly with the forward ends joined by a cross handle bar 51 which is conveniently grasped by the operator. The pivoting of the handle 50 downwardly toward the cover 8 moves the larger diameter radius 46 of the cam 41 onto the cover 8. In the locking position, the locking cam surface 44 abuts the inner wall 48 of bar 7 as shown in FIGS. 3. The reverse, upward pivoting of the handle 50, moves the smaller diameter portion 47 of the cam 41 onto the cover 8, and simultaneously the cam locking surface 45 abuts the inner wall 48 of the bar 7. The cam surface 44 and 45 serve to lock the handle 50 in the alternate position and require a positive turning force on the handle to open and close the cover.

When the handle 50 is pivoted downwardly and cam 41 pivots to force the cover 8 down and the bar 7 upwardly, the hook 34 engages rod 35 and limits the upward movement of the bar 7. This latching movement is completed within the initial pivoting of the release handle 50 to a closed cover position. Once the latch unit 9 is set, the bar 7 cannot move upwardly. Further, the lock surface 45 moves toward alignment with the base wall 48 of the bar 7. The continued pivoting of the release handle 50 rotates the cam 41 such that the largest radius 46 rotates on to the cover 8. The bar 7 cannot now move because of the latch unit 9 and consequently the cover 8 moves down, forcing the gasket 21 into the groove 22 in the cover 8 and onto the top edge of the pot 3 and insuring the positive movement of the cover 8 to a tightly sealed position.

The release handle 50 must now be raised to release the cam bar 7 in order to openn the latch unit 9. The initial movement of the handle 50 rotates the cam 41 in the opposite direction with a lesser radius portion 47 engaging the cover 8 and the locking corner moving onto the inner wall of the cover. The initial movement compresses the gasket 21 with the cam pivot unit moving within the slots to accommodate the movement of the cam 41 from surface to surface. The handle 50 must be moved with a force and then the small radius moves into alignment with the cover 8 and the second locking surfaces 44 engages the inner wall 48 of the bar 1. This complete movement releases the bar and cover, with the hook 34 below but aligned with the hook bar 35, as shown in FIG. 7. If there is any slight pressure in the cooker pot 3, it can slightly raise the cover 8 as limited by the latch unit 9 and provide release about the total periphery of the cover.

The safety pressure interlock unit 11 limits opening of the cover 8 if a dangerous pressure exists within the pot. The interlock unit 11 includes a vertical sliding pin 11 slidably mounted in a journal 52 secured to the cover 8 and operable to interfere with the movement of the handle 50 from the closed position when the pin 11 is raised. The pin journal 52 is a sleeve secured in an opening in the cover 8 and integrally joined to an inwardly opening cup cylinder 53. A piston member 54 is secured to the inner end of the pin 41 and slides in the cup cylinder 53, with a sealing interface o-ring 55 to seal the piston to the cylinders. With pressure in the pot 3, the piston 54 and pin 11 are forced outwardly and move adjacent the one side of the handle 50. A lock pin 56 is secured to the side of the handle 50. When the cover 8 is in the lowered position and the handle 50 moved to the closed position, any significant pressure in the pot 3 raises the pin 11 to the interlock position and in the path followed by the lock pin 56 when the handle 50 is move to the release position. This prevents release of the cam unit 10 and raising of cover from pot 3 until the pressure drops sufficiently to lower pin 11 below pin 56. Thus, the opening of the cover unit 6 cannot be affected with any significant pressure within the pot 3.

In summary, in operation the cover unit 6 is opened by movement of the cam release handle 50 followed by pivoting of the latch unit 9 for raising of the cover unit to the vertical position shown in FIG. 2. The food basket is placed into the cooking pot 3 and the cover lowered to the closed position. In this position, the latch unit 9 has the hook member 34 aligned with the rod 35 but may be spaced downwardly therefrom, as shown in FIG. 7, by pressing down in the handle 37 to overcome the force of spring 30. The clamp bar 7 is pivoted downwardly and rests on the cover 8. The cam handle 50 is pivoted downwardly simultaneously causing the relative expansion of the latch bar 7 until the clamp 34 engages the rod 35 and sets the latch unit. The final movement of the handle 50 possitively forces the cover downwardly with the gasket 22 compressed and deformed within the dovetail groove 22. The system is now operated to effect cooking with the pressure building within the pot 3. The pressure moves the interlock pin 11 outwardly into the path of the lock pin 56 on the side of the handle 50. This prevents movement of the handle 50 to the release position until the pressure is relieved. At the end of the cooking cycle, the solenoid valve unit is energized and releases the pressure in the pot 3. The pin 11 drops downwardly releasing the handle 50. The operator must now release the handle 50 before the latch unit 9 can be released. Further, the release of the handle 50 causes the cam 41 to rotate to the low radius position and with the lock surface 40 moving into alignment with the clamp bar. This releases the cover 8 for the relative movement with respect to the clamp bar 7. In this release position again the clamp bar 7 thus tends to drop downwardly with the hook 34 below the pin 35 but remaining in alignment therewith. The spring raises the bar to engage the latch. Any residual pressure in the pot can act on the cover 8 and pass through the edge of the cover and preferablly around the seal to positively prevent creation of a dangerous condition. Thus, the cover is positively released, but relatched to minimize any pressure condition.

The operator can then raise the latch unit releasing the cover and again raising it to fully open the phantom line position shown in FIG. 9.

The present invention thus provides a readily constructed cover assembly. Thus the cover plate self is formed form an appropriate solid metal within which the special sealing groove is readily provided. The clamp bar unit and the pivot structure is readily provided using conventional technology and materials. The cover apparatus is nevertheless easily and readily operated with minimal skill while maintaining maximum level safety in the normal operation of the system.

Various modes of carrying out the invention are contemplated as being within the scope of the invention following claims particularly pointing out and distinctly claiming the subject matter which is regarded as the invention.

I claim:

1. A pressurized cooking apparatus comprising a cooking pot formed of a heat transmitting material and adapted to contain a cooking liquid and having a top sealing wall, a clamp bar member having a pivotal connection pivotally mounted to said cooking pot and projecting over said pot to a free end, a mechanical releasable latch unit interconnected between the pot and outer free end of the clamp bar member, said latch unit having a disengaged position with the clamp bar pivoted toward the cooking pot and engaged by upward pivoting of said bar member, a cover member having an annular sealing means adapted to rest in abutting sealing engagement with the upper edge of said cooking pot, a cam unit connected to said clamp bar and to said cover member to form an intergrated assembly with said member movable with said clamp bar and including a movable cam element adapted to spread said clamp bar and cover member, an operating handle connected to said cam element for moving said cam element, said cam element having a release position wherein said cover member abuts said cooking pot and said latch unit is in said disengaged position to permit limited upward movement of said cover member to provide release of residual pressure in the cooking pot, and said cam element having a locking position operable to spread said clamp bar relative to said cover to simultaneously force said cover into engagement with the cooking pot and simultaneously lift said clamping bar to effect closing engagement of said latch unit.

2. The cooking apparatus of claim 1 including a pressure sensitive mechanical mechanism coupled to said cooking pot and moving into engagement with said operating handle to positively prevent movement of said handle and thereby said cam member to a release position with a predetermined pressure to said cooking pot.

3. The cooking apparatus of claim 1 wherein said cover member is a solid plate member having a flat inner face, said plate having an annular groove in said inner face aligned with said sealing wall, said groove extending laterally from the surface of the cover member, said sealing means includes a sealing ring element having a width less than the width of said groove and located within said groove and engaged with said upper wall under pressure, said sealing element being deformed into said groove to establish a high pressure seal.

4. The cooking apparatus of claim 1 having an oil collector secured to said bar member in alignment with said opening, and a drain line connected to said collector for draining oil from said cover.

5. The cooking apparatus of claim 1 wherein said pivot connection includes a pair of pivot plates fixed to the side wall of the pot and projecting upwardly and outwardly above the pot, a cup-shaped collector secured between said pivot plates and located to capture oil draining from the cover in the raised vertical position, and a drain line connected to said collector for draining said oil from said cover.

6. The cooking apparatus of claim 1 wherein said cam element includes a spiral cam surface, and said cam element includes a pair of adjacent flat surfaces opposite the spiral cam surface, said flat surfaces located to engage the inner wall of the clap bar to hold the cam and handle in the alternate locations.

7. The cooking apparatus of claim 1 wherein said clamp bar is an inverted channel member, said cam element is an elongated rotatably mounted between the sidewalls, said cam element having a spiral cam having a cam shaft surface, said cover having a pair of coupling arm projecting upwardly and coupled to the cam shaft by coupling slots to pivotally mount the cover to the bar and permitting limited relative movement therebetween, said operating handle is a U-shaped release handle which has side arms coupled to the cam shaft and is operable to pivot the cam element between the two positions.

8. The cooking apparatus of claim 7 wherein said cam element includes a pair of adjacent flat surfaces located to engage the inner wall of the clamp bar to hold the cam and handle in the alternate locations.

9. The cooking apparatus of claim 7 wherein latch unit includes a hook plate pivotally secured to the outer end of the clamp bar, a hook rod secured to the pot in alignment with said hook plate, the lower end of said hook plate having a upwardly opening hooked located below said hook rod in said release position and said hook plate being pulled upwardly into latching engagement with said rod by the movement of the cam to the cover close position.

10. A pressurized cooking apparatus comprising a cooking pot formed of a heat transmitting material and adapted to contain a cooking liquid and having a top sealing wall, a clamp unit having a pivotal connection pivotally mounted to said cooking pot and projecting over said pot to a latch end, a mechanical releasable latch unit interconnected between the pot and the latch end of the clamp unit, said latch unit having a disengaged position with the clamp bar pivoted toward the cooking pot and being engaged by movement of the clamp unit to a cover closing position, a cover adapted to engage the upper end of said cooking pot to establish a pressurized closure of the pot, means interconnecting said clamp unit and said cover to form an integrated assembly and including a movable element adapted to spread said clamp unit and cover in a locking position to simultaneously force said cover into sealing engagement with the cooking pot and simultaneously effect engagement of said latch unit, an outer operating handled connected to said movable element for moving the movable element and having a projecting locking pin member, and a pressure sensitive mechanical mechanism coupled to said cooking pot and said mechanical mechanism including an exposed locking pin member moving into moving into alignment with said locking member of said operating handle to establish a visible interlock with said operating handle and positively preventing movement of said operating handle to a release position with a predetermined pressure in said cooking pot.

11. The cooking apparatus of claim 10 wherein said cover includes a flat inner face, said plate having an inner dovetail groove in said inner face aligned with said sealing wall, a sealing element located in said groove having a width less than the width of said groove and adapted to engage said sealing wall under pressure and deformed in said groove to establish a high pressure seal.

12. The cooking apparatus of claim 11 wherein said pivot connection includes a pair of pivot plates fixed to the side wall of the pot and projecting upwardly and outwardly above the pot, an upwardly opening cup-shaped collector pan secured between said pivot plates and located to capture oil draining from the cover in a raised vertical position of said cover, and a drain means connected to said collector pan for draining said oil from said cover.

* * * * *